(12) United States Patent  
Dalvander

(10) Patent No.: US 8,376,334 B1
(45) Date of Patent: Feb. 19, 2013

(54) GLUE FREE VACUUM SEALING GASKET STRUCTURE

(75) Inventor: Göran Dalvander, Motala (SE)

(73) Assignee: Swedcord Development AB, Vasteras (SE)

( * ) Notice: Subject to any disclaimer, the term of this patent is extended or adjusted under 35 U.S.C. 154(b) by 0 days.

(21) Appl. No.: 13/281,571

(22) Filed: Oct. 26, 2011

(51) Int. Cl.
*B23Q 3/08* (2006.01)

(52) U.S. Cl. ....... 269/21; 269/903; 269/289 R; 29/281.5

(58) Field of Classification Search ............. 269/21, 269/20, 289 R, 900, 903; 29/281.1, 281.5
See application file for complete search history.

(56) References Cited

U.S. PATENT DOCUMENTS

| | | | | |
|---|---|---|---|---|
| 4,184,292 A | * | 1/1980 | DeFazio et al. | 451/388 |
| 5,054,193 A | * | 10/1991 | Ohms et al. | 29/840 |
| 5,421,595 A | * | 6/1995 | Cripe et al. | 279/3 |
| 5,704,599 A | * | 1/1998 | Slothower | 269/21 |
| 5,906,363 A | * | 5/1999 | Reis et al. | 269/21 |
| 7,055,229 B2 | * | 6/2006 | Wilk et al. | 29/281.1 |
| 7,731,166 B2 | * | 6/2010 | Kaiser et al. | 269/21 |
| 7,757,363 B2 | * | 7/2010 | Wilk et al. | 29/281.1 |
| 8,096,537 B2 | * | 1/2012 | Browne et al. | 269/21 |
| 2003/0141673 A1 | * | 7/2003 | Olgado et al. | 279/3 |
| 2008/0029945 A1 | * | 2/2008 | Kaiser et al. | 269/21 |
| 2009/0057971 A1 | * | 3/2009 | Bumgarner et al. | 269/21 |
| 2011/0169206 A1 | * | 7/2011 | Barlier et al. | 269/21 |

FOREIGN PATENT DOCUMENTS

WO 01/78970 A1 10/2001

* cited by examiner

*Primary Examiner* — Lee D Wilson
(74) *Attorney, Agent, or Firm* — Staas & Halsey LLP

(57) ABSTRACT

A tool to hold objects by suction includes a glue free gasket structure on its handling surface. The gasket structure includes a gland formed below the handling surface having an approximate dovetail section with a narrow opening at the handling surface defining a suction area, and a gasket inserted in the gland. The gasket has a shoulder portion that conforms to the shoulder portion of the dovetail section of the gland, and a sealing lip protruding through the narrow opening at the handling surface. The gasket fits movably in the gland, and is self-aligning to compensate for variations in the space between the holding surface and the object being handled. This gasket structure is especially useful for devices to cool injection molded parts.

15 Claims, 17 Drawing Sheets

GLUE FREE VACUUM SEALING GASKET STRUCTURE

BACKGROUND

1. Field

The present invention relates to a vacuum sealing gasket structure and more particularly to a vacuum sealing gasket structure where a gasket can be rapidly secured in a gland without adhesive and a treatment tool utilizing the gasket structure.

2. Description of the Related Art

In a casting process, objects are formed in a casting machine by adding liquid casting material to a forming tool. The forming tool includes a casting space, the shape of which corresponds to the shape of the object. The forming tool usually includes two halves, where one side is movable and the other is fixed. The forming tool is usually equipped with cooling members such as cooling flanges or cooling channels. The object is kept in the forming tool until it has cooled sufficiently in order to, for example, be transported on a conveyor belt and still keep its shape. When the object is sufficiently cooled to allow further treatment, the forming tool is opened by moving the movable side to the side and the object is picked out of the casting machine. Thereafter, the next object can be cast.

The time it takes to cast an object is called the cycle time, and the cycle time determines the number of objects that can be produced per time unit. For casting processes producing large volumes, short cycle times are important in order to produce as much as possible. To reduce cycle times down has proven to be difficult in view of physical obstacles, such as that the forming tool must reach a certain temperature before the casting material can be added to the forming tool and that the object must be cooled in the forming tool in order to keep its exact shape. If the object is moved too early from the forming tool, there is a risk of skew, dimensional deviations cracking and deformation created from the ejectors pine. However, the cycle time has been decreased by optimizing the time for closing, filling, cooling, opening and ejection. An essential part of the cycle time is constituted by the time for cooling the object, the cooling time, which has as its only purpose to secure the objects dimensional accuracy and quality. In certain casting processes, the cooling time can be up to 70-80% of the total cycle time.

Recently, a device and method for thermal treatment that reduces total cycle time has been proposed in International Publication No. WO 01/78970. In International Publication No. WO 01/78970, it has been proposed to transport the object from the forming tool to a treatment tool, which includes a treatment surface, the shape of which at least in some parts imitates the casting space and is arranged outside the casting machine, so that some of the time for cooling can take place outside the casting machine, which in turn means that the cycle time is shortened.

In International Publication No. WO 01/78970, the treatment tool includes a vacuum tube to connect the object to the treatment tool in order to pull the object out of the casting space and further to prevent the object from falling out of the treatment tool during the transportation from the forming tool. In order to maintain the seal of the vacuum between the object and the treatment tool, a gasket surrounds a periphery of the treatment tool.

However, when used with the treatment tool, a conventional gasket has numerous disadvantages. For example, due to the temperatures, chemical and mechanical degradation while the device handles the object, a conventional silicone rubber gasket has a short lifespan and also must be glued into the track. In view of the short lifespan of the gasket and the complicated process removing a glued-in gasket, cleaning the gasket glue surfaces, applying glue to a new gasket, and installing the new gasket, a conventional device for thermal treatment such as disclosed in International Publication No. WO 01/78970 is subject to significant down time.

SUMMARY

Therefore, it is an aspect of the present disclosure to provide a gasket structure that has an increased lifespan and is able to be quickly replaced and a device for thermal treatment utilizing the gasket structure.

Additional aspects and/or advantages will be set forth in part in the description which follows and, in part, will be apparent from the description, or may be learned by practice of the disclosure.

According to an aspect of the present disclosure, a tool having a gasket structure includes a treatment surface; a vacuum tube; inlet and outlet members to inlet and outlet a cooling medium; cooling channels to transport the cooling medium; a gland formed on a periphery of the treatment surface; and a gasket placed in the gland.

In the tool, the gland may include an opening at a top portion thereof on the treatment surface; an approximate dovetail portion which expands from the opening; and a groove formed at a bottom of the gland.

In the tool, the gasket may be formed as a closed loop and include a sealing lip that is configured to protrude through the opening of the gland; and a shoulder portion that approximately conforms to the approximate dovetail portion of the gland.

In the tool, the shoulder portion of the gasket may have a convex shape and the approximate dovetail portion of the gland may have a concave shape.

In the tool, the shoulder portion of the gasket may have a concave shape and the approximate dovetail portion of the gland may have a convex shape.

In the tool, the shoulder portion of the gasket may have a flat shape and the approximate dovetail portion of the gland may have a flat shape.

In a preferred form of the tool, a cross section of the gasket may be smaller than the cross section of the dovetail portion of the gland, so the gasket can self-align.

In the tool, no adhesive is used to secure the gasket in the gland.

In the tool, the gasket may include a plurality of segments arranged end to end, with a small gap separating the abutting ends of the segments.

The tool may further include a compressed air inlet.

In the tool, the compressed air inlet may be connected to the gland, whereby compressed air acting on the bottom of the bottom of the gasket may be used to move the gasket lip out of the opening in the gland.

In accordance with another aspect of the present disclosure, a thermal treatment device includes a forming tool, the forming tool including a fixed part and a movable part; a handling member, the handling member being a robot; and a treatment tool carried by the handling member, where the treatment tool includes a treatment surface; a vacuum tube; inlet and outlet members to inlet and outlet a cooling medium; cooling channels to transport the cooling medium; a gland formed on a periphery of the treatment surface; and a gasket placed in the gland.

In the thermal treatment device, the gland may include an opening at a top portion thereof on the treatment surface; an approximate dovetail portion which expands from the opening; and a groove formed at a bottom of the gland.

In the thermal treatment device, the gasket may be formed as a closed loop and include a sealing lip that is configured to protrude through the opening of the gland; and a shoulder portion that approximately conforms to the approximate dovetail portion of the gland.

In the thermal treatment device, the compressed air inlet may be connected to the gland, whereby compressed air acting on the bottom of the bottom of the gasket may be used to move the gasket lip out of the opening in the gland.

In the thermal treatment device, a cross section of the gasket may be smaller than or larger than the cross section of the dovetail portion of the gland.

In the thermal treatment device, no adhesive is used to secure the gasket in the gland.

BRIEF DESCRIPTION OF THE DRAWINGS

These and/or other aspects and advantages of the invention will become apparent and more readily appreciated from the following description of the embodiments, taken in conjunction with the accompanying drawings, of which:

FIGS. 7A-7C show an alternative gasket structure using a standard round silicon gasket with an cross section larger than gland it is fitted in.

DESCRIPTION OF EMBODIMENTS

Figure 1A:
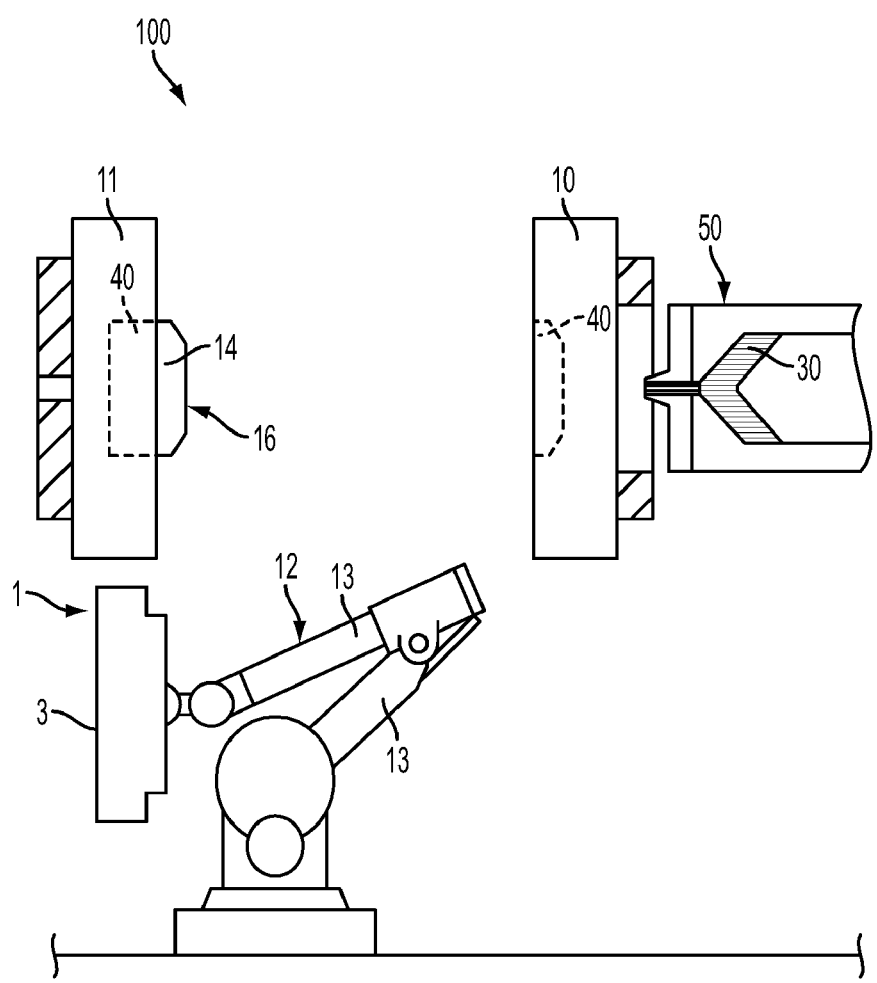
FIGS. 1A-1C show a thermal treatment device according to an embodiment of the present disclosure in various stages of operation.

Reference will now be made in detail to the embodiments of the present disclosure, examples of which are illustrated in the accompanying drawings, wherein like reference numerals refer to like elements throughout. The embodiments are described below to explain the present invention by referring to the figures.

Figure 1B:
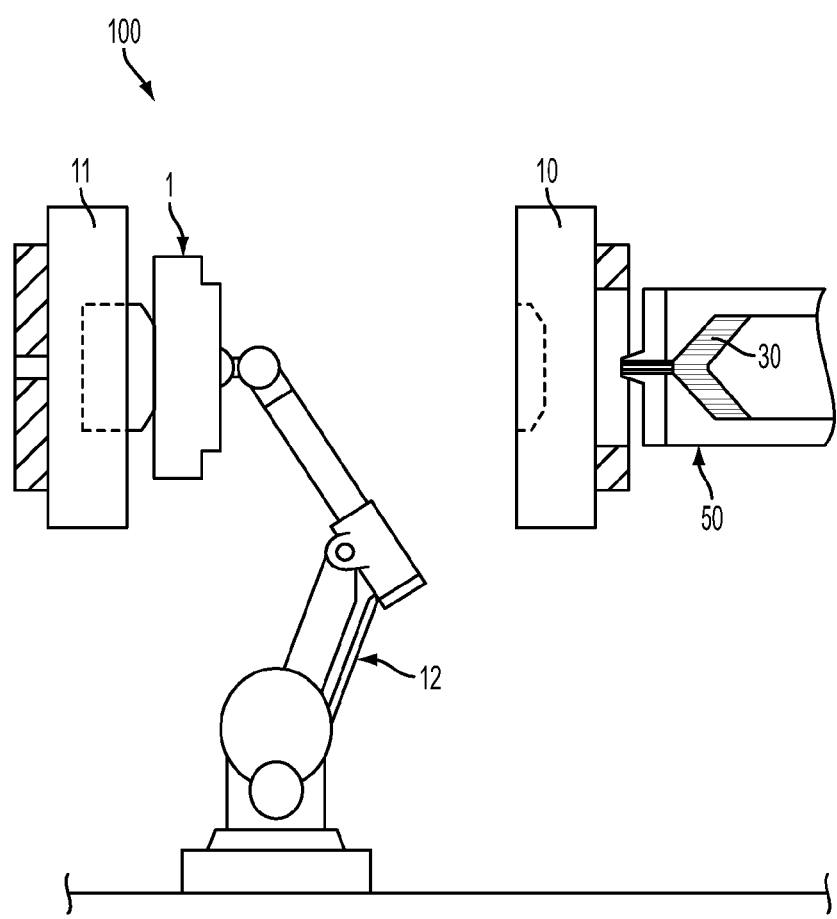
Figure 1C:
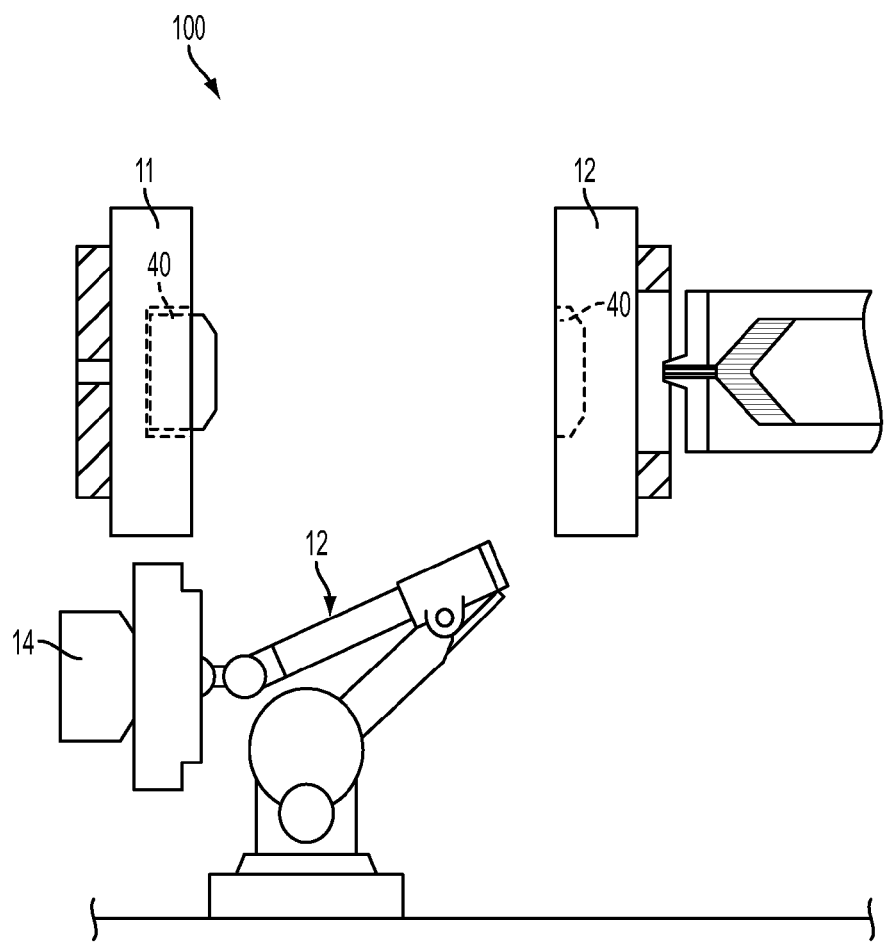

FIGS. 1A-1C shows a thermal treatment device 100 according to an embodiment of the present disclosure in various operational phases. The thermal treatment device 100 includes a casting machine 50, a treatment tool 1 and a handling member 12.

The casting machine 50 includes a forming tool 10, 11 made up of a fixed part 10 and a movable part 11. The treatment tool 1 is carried by a handling member 12, which in this embodiment example is a six-axis robot 12. The robot 12 includes arms 13 which are rotatably arranged in relation to each other. When the forming tool 10, 11 is closed and fixed, liquid plastic material 30 is pressed into the forming tool 10, 11. Cooling takes place in the forming tool until at least the outer layer of the object 14 is essentially formstable, i.e. until the object 14 is sufficiently stable to allow transportation to the treatment tool 1. When the object 14 has such a formstability, the forming tool 10, 11 is opened as shown in FIG. 1A. The treatment tool 1 is transported by the robot 12 to the movable part 11, where the object 14 is situated, as shown in FIG. 1B, and is docked with the object 14 so that the surface 16 of the object 14 bears against treatment surface 3 of the treatment tool 1. When the surfaces 3, 16 are fitted to each other, suction is applied to the space between the two surfaces 3, 16, so the object 14 is connected to the treatment surface 3. Thereafter, the robot transports the treatment tool 1 with the object 14 away from the forming tool 10, 11 to a suitable place outside the casting machine 50 as shown in FIG. 1C. The robot 12 stays in this position there and holds the treatment tool 1 for some time, while the object 14 is cooled.

The side of the object 14 which bears against the treatment tool 1 is cooled by the treatment tool 1 and the side facing away from the treatment tool 1 is cooled by the surrounding air. When the object 14 has reached the intended temperature, i.e. when its shape is sufficiently stable to withstand further treatment, the object 14 is delivered by the handling member 12 to, for example, a conveyor belt.

During the casting process, the casting material 30 passes from a melted phase into a solid material. Regarding the strength of the object 14, it is desirable that the object 14 is cooled slowly into a solid shape in order to minimize the growth of inner tensions and the risk for cracking. On the other hand, it is desirable that the melt is cooled relatively quickly in order to minimize the time length of the forming cycle.

Three phases of the casting process can be distinguished. In a first phase, the casting material 30 is a liquid melt, i.e. when a casting space 40 of the forming tool 10, 11 is filled with casting material 30. The melt will first congeal close to the colder wall portions of the forming tool 10, 11. When this happens, however, the inner parts are still melted. This means a second phase of the forming process where the outer layer of the formed casting material is congealed and its interior is a viscous melt. When the outer layer congeals, it will contract to a certain degree. As a consequence of this, tensile stress will appear in the outer layer, since it strives to contract more than the interior of the casting material. At this second phase, the outer layer is essentially form-stable. A third phase of the forming process commences after a certain period of time, when the interior parts of the formed casting material also congeal and wants to contract.

Figure 2A:
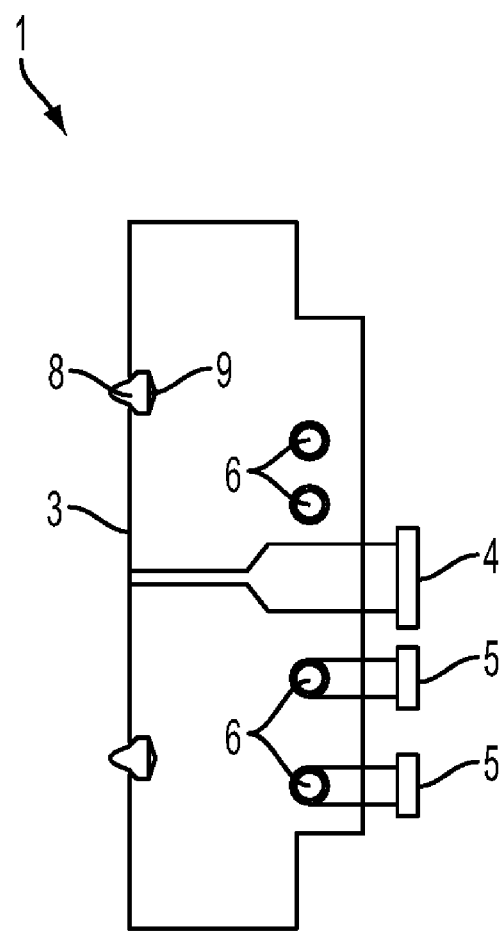
FIG. 2A shows a treatment tool according to an embodiment of the present disclosure.

FIG. 2A shows a treatment tool 1 according to an embodiment of the present disclosure having a passive gasket structure. The treatment tool 1 includes a treatment surface 3, a vacuum tube 4, inlet/outlet members 5 for a cooling medium, cooling channels 6 for transport of the cooling medium, a gasket 8 and a gland 9.

The vacuum tube 4 leads to the treatment surface 3 and is configured to create a suction holding the surface 16 of the object 14 to the treatment surface 3 of the treatment tool.

Figure 3A:
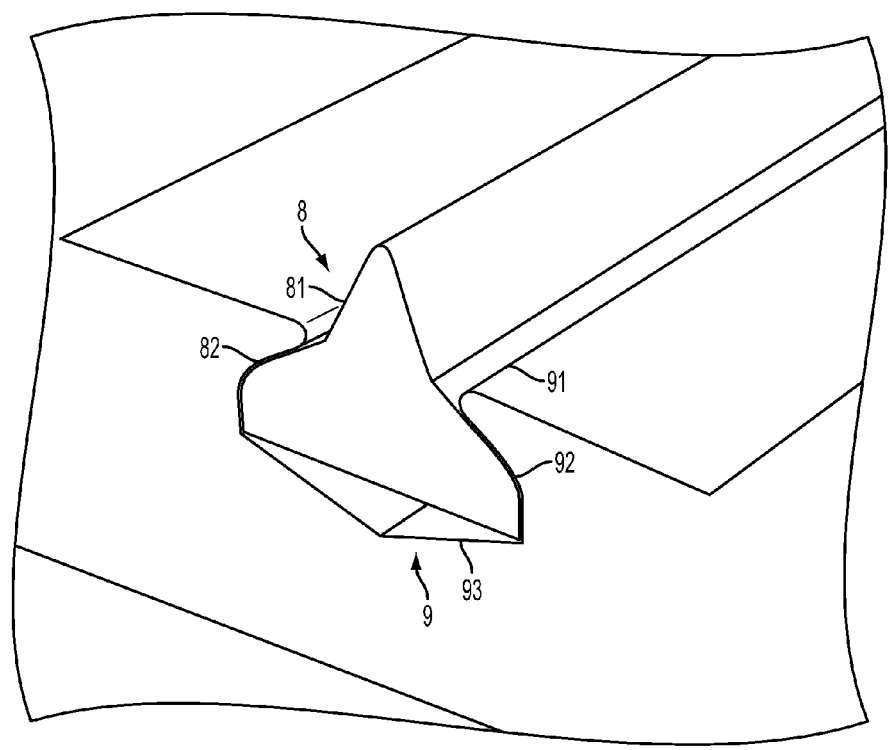
FIG. 3A shows a gasket structure according to an embodiment of the present disclosure.

Referring to FIG. 3A, the gland 9 includes an opening 91 at the top of the gland 9, an approximate dovetail portion 92 which expands from the opening 91 and a groove 93 formed at a bottom of the gland 9. The gland 9 and the gasket 8 form a closed loop in the treatment surface 3, which defines a suction area. The gasket includes a sealing lip 81 that protrudes through the opening 91 of the gland 9. The gasket 8 further includes a lower rounded shoulder portion 82 that approximately conforms to the approximate dovetail portion 92. The gasket 8, and particularly the lower rounded shoulder portion 82, fit loosely in the gland 9. The gasket 8 is installed in the gland 9 with the sealing lip 81 protruding from opening 91 of the gland 9. Subsequently, during operation of the thermal treatment device 100, when the object 14 which bears against the treatment surface 3 of treatment tool 1, the surface 16 of the object 14 presses the lip 81 of the gasket 8 into the gland 9 to minimize the space between the object 14 and the treatment surface 3.

In greater detail, when the treatment surface 3 of treatment tool 1 is approaching the object 14, the gasket 8 and gland 9 are configured so that the sealing lip 81 on the gasket 8 can move relatively freely in and out of the opening 91 of the gland 9 perpendicular to the surface 16 of the object 14, so that sealing lip does not have to bend, which improves the lifespan of the gasket 8.

When a vacuum is applied through the vacuum tube 4 to the treatment surface 3, the lower rounded shoulder portion 82 will be sucked up against the top of the approximate dovetail portion 92, so that a seal is obtained between the lower rounded shoulder portion 82 and the top of the approximate dovetail portion 92, while the sealing lip 81 is pressed firmly against the surface 16 of the object 14.

The groove 93 in the gland 9 formed below the gasket 8 allows movement of the sealing lip 81 along the length of the gasket structure, which allows the sealing lip 81 to adapt to small variations in the gap between the treatment tool 1 and the surface 16 of the object 14.

Figure 5:
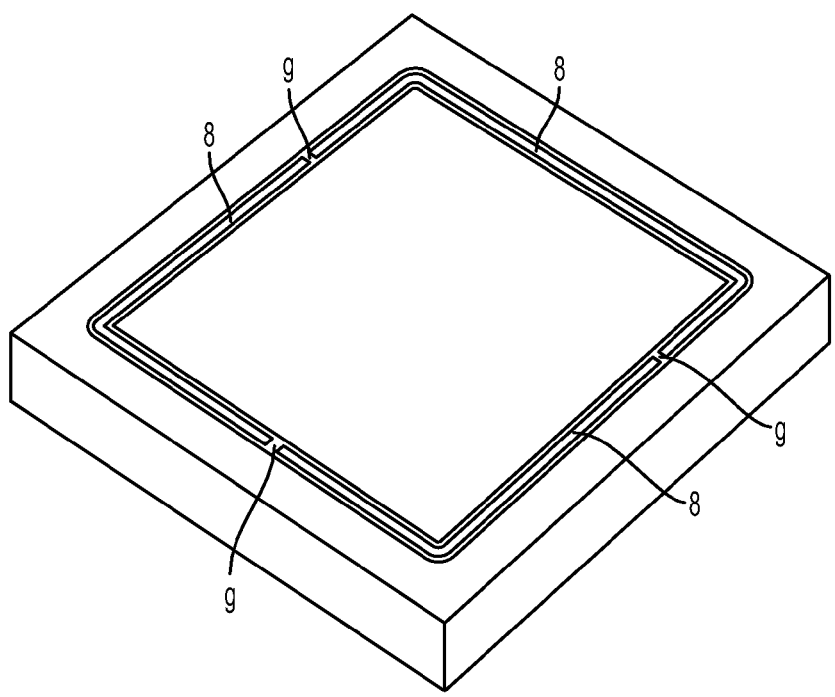
FIG. 5 shows a treatment tool according to an embodiment of the present disclosure.

In order to tolerate high operating temperatures, the gasket 8 may be made of silicon rubber, which is quite soft. When vacuum is applied at the gland 9, the soft gasket material expands, so an airtight seal is obtained even if the gasket 8 is assembled from short pieces that fit imperfectly end-to-end, as shown in FIG. 5.

When the gasket 8 reaches the end of its service life, the gasket 8 can be easily removed from the gland 9 since no glue or other adhesive is required to secure the gasket 8 in place. Further, installation of a new gasket 8 is easily accomplished because the gasket 8 is self-aligning in the gland due to the interaction of the sealing lip 81 with the opening 91.

Another advantage of the passive gasket structure is that it is self-healing and less susceptible to damage to the gasket. This is because the sealing lip 81 of the gasket 8 will be pressed into the lower part of the gasket, without being bent or flattened. Further, in the passive gasket structure, the gasket 8 may be formed of multiple pieces of gasket 8, 8, 8 separated by gaps g, such as shown in FIG. 5, instead of necessarily being formed as a continuous strip.

Figure 3B:
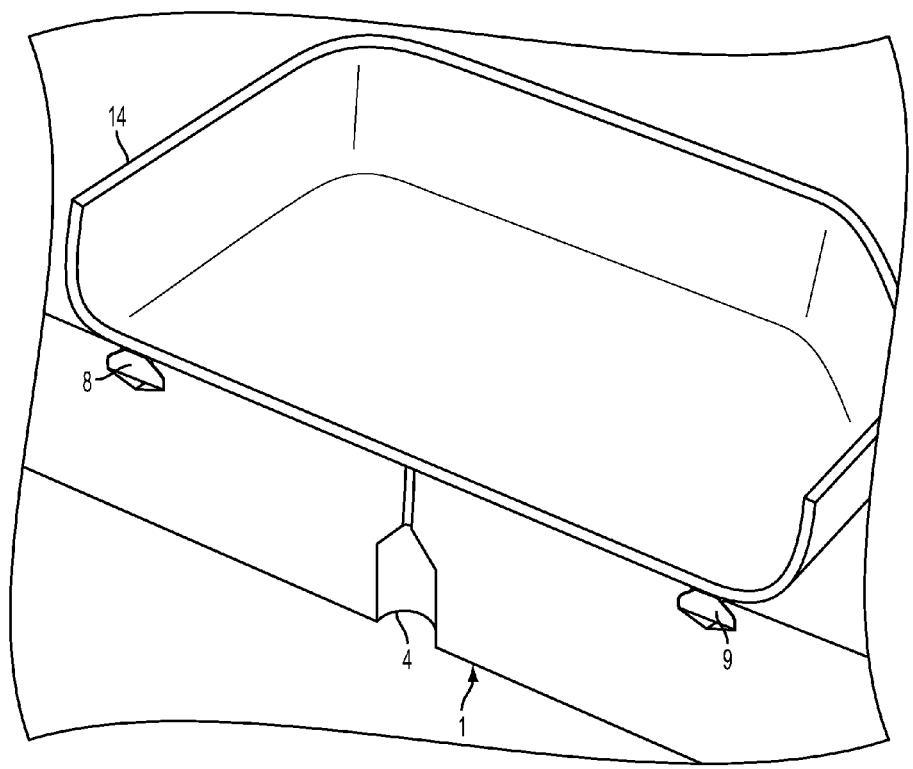
FIGS. 3B-3D show a treatment tool according to an embodiment of the present disclosure.
Figure 3C:
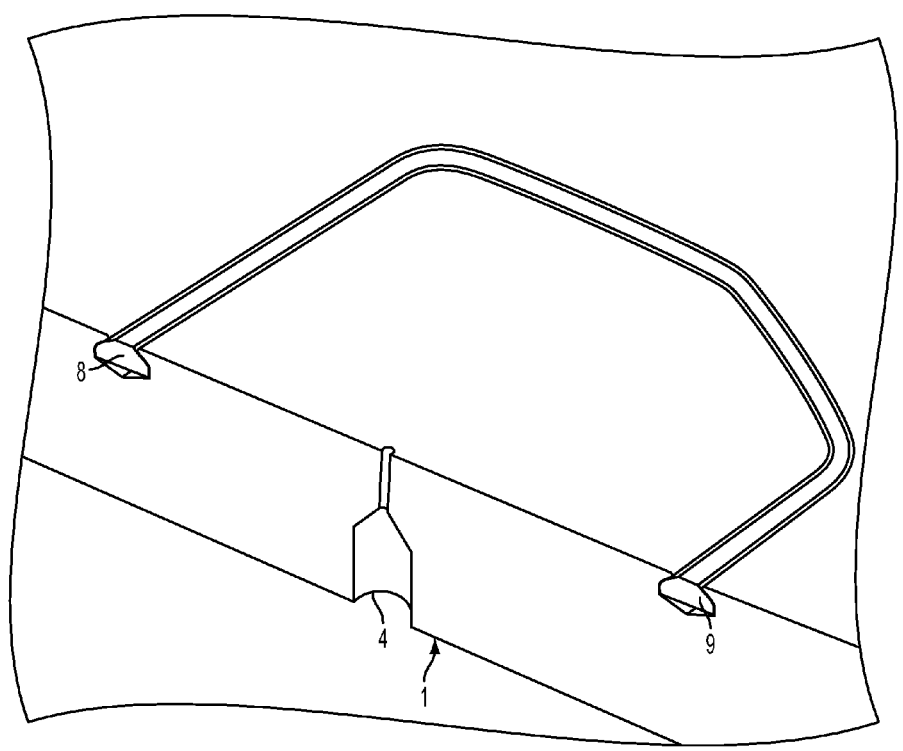
Figure 3D:
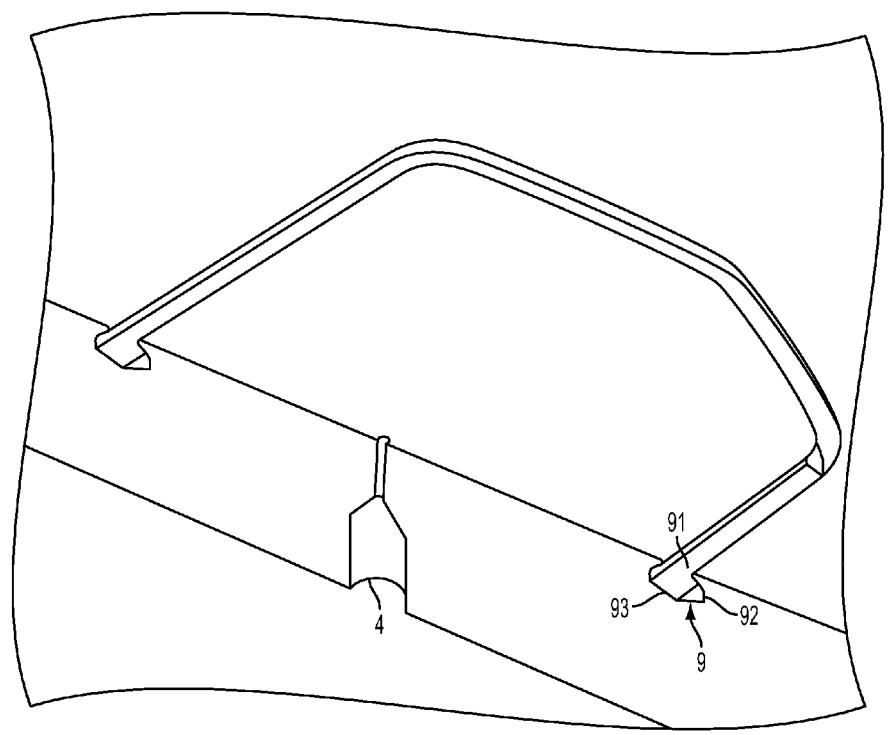
Figure 4A:
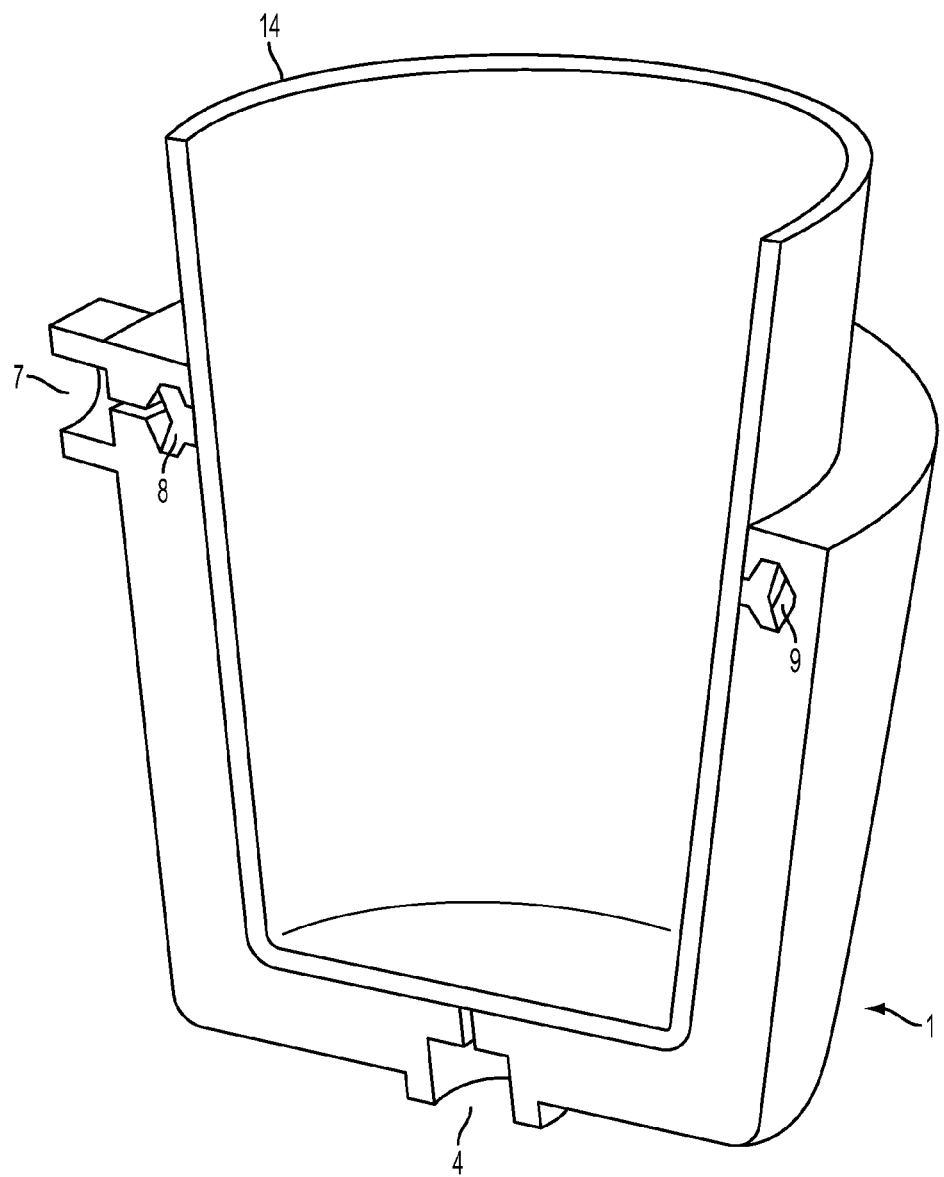
FIGS. 4A and 4B show a treatment tool according to another embodiment of the present disclosure.
Figure 4B:
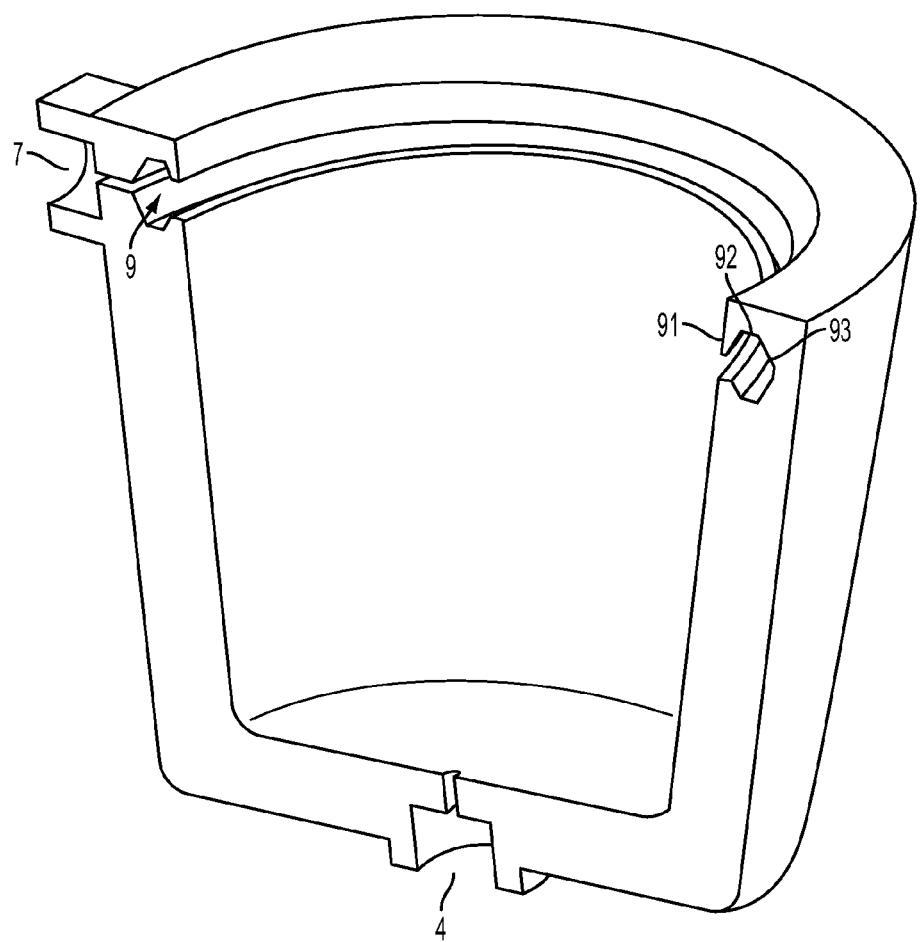

The embodiment of the present disclosure shown in FIGS. 3B-3D is a passive gasket structure, as opposed to the active gasket structure discussed later. The passive gasket structure may be used in all cases where the gland 9 can be located in an approximately flat part of the treatment surface 3, so an effective seal can be achieved before vacuum is applied. The passive gasket structure is not suitable when the gland 9 must be located in a concave treatment surface, as shown in FIGS. 4A and 4B.

The passive gasket structure is not limited to the thermal treatment device 100, but may be utilized in any application where two surfaces are held together by vacuum, for instance when holding a work-piece in place on the table of a cutting or grinding machine.

Figure 2B:
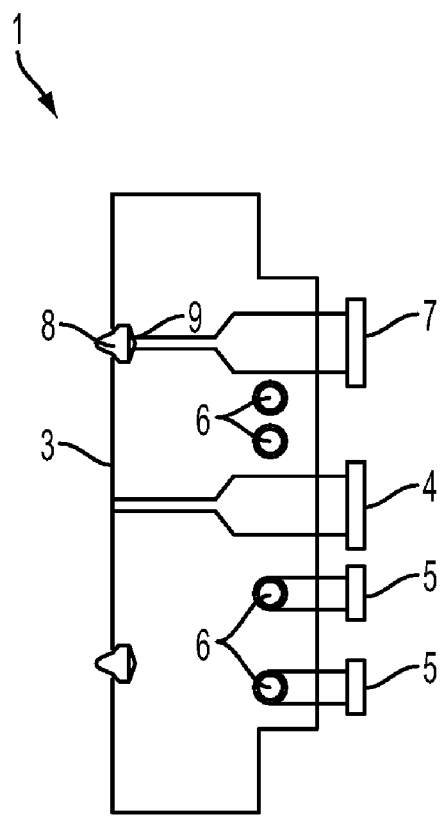
FIG. 2B shows a treatment tool according to an embodiment of the present disclosure.

FIG. 2B shows a treatment tool 1 according to another embodiment of the present disclosure. Similar to the embodiment shown in FIG. 2A, the treatment tool 1 includes a treatment surface 3, a vacuum tube 4, inlet/outlet members 5 for a cooling medium, cooling channels 6 for transport of the cooling medium, a gasket 8 and a gland 9. However, the treatment tool 1 shown in FIG. 2B further includes a compressed air inlet 7.

The compressed air inlet 7 is connected to the gland 9 to allow compressed air from an air pump (not shown) to enter the gland 9.

Figure 3E:
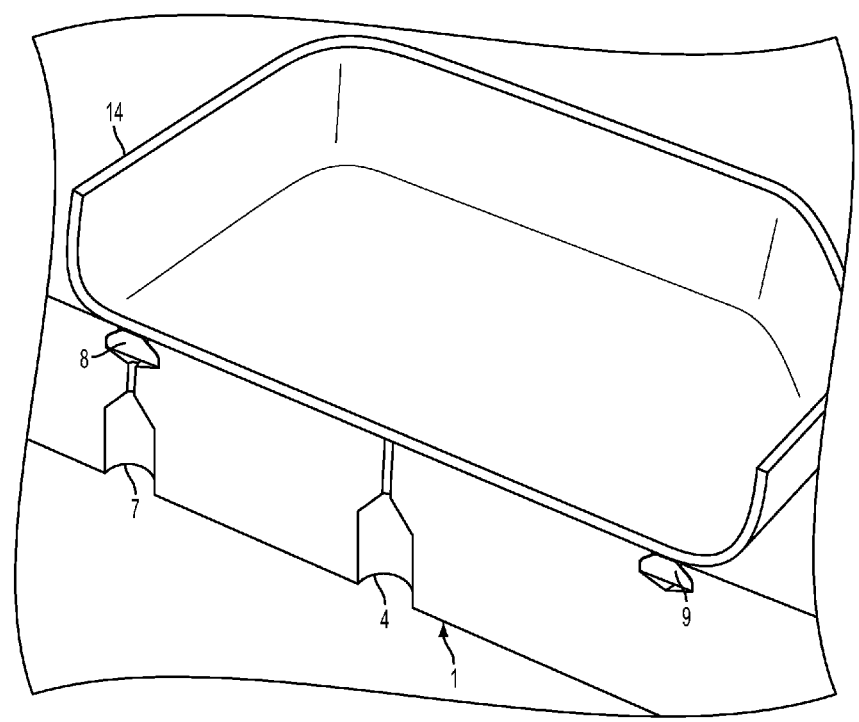
FIGS. 3E-3G show a treatment tool according to an embodiment of the present disclosure.
Figure 3F:
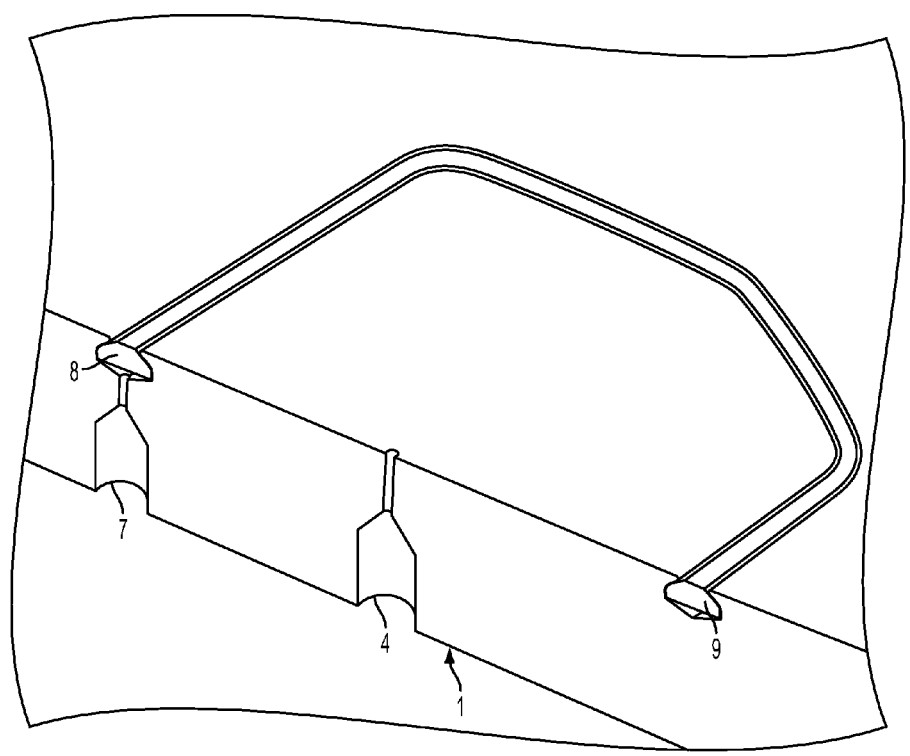
Figure 3G:
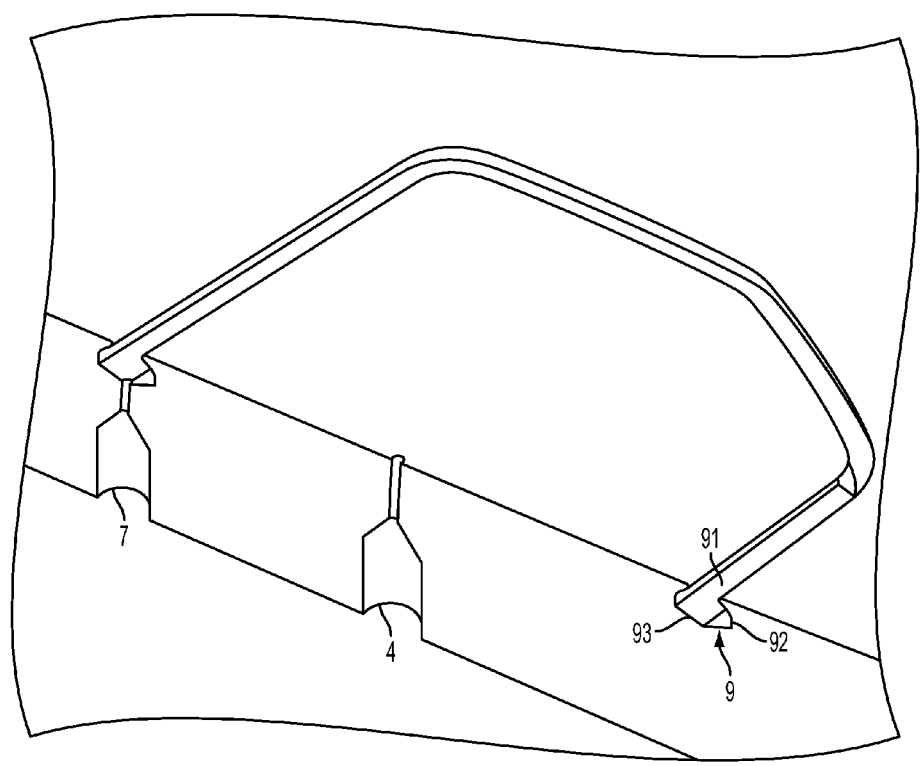

As shown in FIGS. 3E-3G, the gasket 8 is installed in the gland 9 with the sealing lip 81 protruding from opening 91 of the gland. Compressed air acting on the bottom of the lower shoulder portion 82 presses the sealing lip 81 towards the surface 16 of the object 14 so a tight seal is obtained before vacuum is applied. Subsequently, during operation of the thermal treatment device 100, when the object 14 which bears against the treatment surface 3 of treatment tool 1, the surface 16 of the object 14 presses the sealing lip 81 into the gland 9 without bending or compressing it. Although FIGS. 3E-3G shows approximately flat matching surfaces 3 and 16, the embodiment shown in FIGS. 3E-3G is primarily utilized to seal matching surfaces that are not approximately flat, such discussed below in reference to FIGS. 4A and 4B.

As such, the active gasket structure is not limited to the thermal treatment device 100, but may be utilized in any application where two surfaces are held together by vacuum, preferably when the sealing surfaces are not substantially flat.

As shown In FIGS. 3E-3G, air pressure behind the gasket 8 forces the sealing lip 81 against the surface 16 of the object 14 after the treatment tool 1 has been moved in place and before vacuum is applied. However, after vacuum has been applied and the seal is complete, it may be possible to remove the pressurized air.

The active gasket structure is primarily utilized where passive gaskets will not work because the curvature of the gland 9 hinders the free movement of the gasket 8.

As shown in FIGS. 4A and 4B, the active gasket structure of the present disclosure may be applied to a bowl shaped treatment tool 1. In this case the gasket 8 cannot move freely in the curved gland 9, so the sealing lip 81 may fail to touch the treatment surface 14 in some places. If that happens, a tight seal cannot be assured before the vacuum is applied. By applying compressed air into the bottom of the gland 9, the lip 81 of the gasket 8 is moved firmly towards the treatment surface 14 before vacuum is applied, so a good seal is ensured.

In the active gasket structure it is not possible to make up a gasket 8 by short sections placed end to end. The gasket material will compress under the increased pressure, so any gaps will expand rather than close, as they do in the passive gasket structure under vacuum.

The advantages of the gasket 8 and gland 9 configuration according to the present disclosure are manifest. As shown in the drawings, the groove 93 of the gland 9 allows for perpendicular movement of the sealing lip 81 of the gasket 8 so that the gasket 8 can seal gaps with variations of up to 1 mm between the suction surface and the object 14.

The sealing lip 81 of the gasket 8, which first contacts the object 14, moves perpendicular to the surface of the object and can descend into the gland 9 without being bent or crushed, because the gasket 8 has room to move inside the gland 9, and the lip 81 protruding from the narrow opening 91 makes the gasket 8 self-aligning within the gland 9. This extends the life of the gasket considerably compared to glued-in gaskets.

The volume of the gasket 8 is less than or equal to the volume of the gland 9. Accordingly, compression of the gasket 8 is minimized, which maximizes the service life of the gasket 8.

Further, the structure of the gland 9 having an opening 91, approximate dovetail portion 92 and groove 93 has numerous advantages. For example, a silicon rubber gasket 8 can be easily inserted into the gland 9 by squeezing it through the opening 91, and it is held in place without use of glue.

In previously described embodiments described above, the gasket 8 was fitted moveably inside the gland 9. It is, however, possible to use a silicon rubber gasket that is larger than the gland, as shown in FIGS. 7A-7C.

Figure 7A:
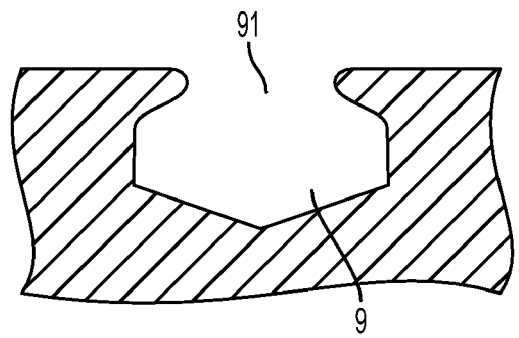
Figure 7B:
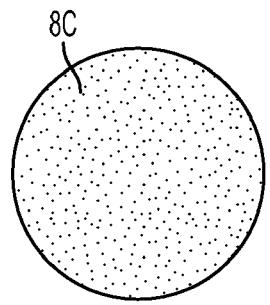
Figure 7C:
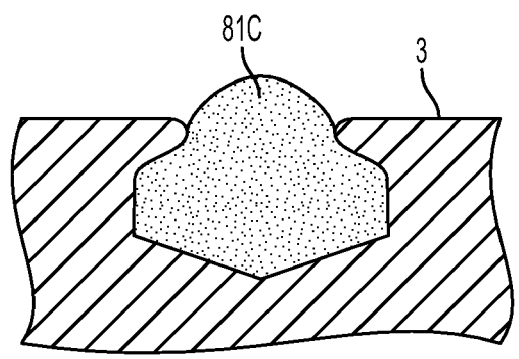

In FIGS. 7A-7C, the gland 9 (FIG. 7A) as described above is fitted with a round silicon gasket 8*c* (FIG. 7B). The round gasket 8*c* is soft, and has been pushed through the opening 91 in the gland 9 (FIG. 7A). Because the gasket has a larger cross section than the approximate dovetail gland 9, a sealing lip 81*c* remains outside the slot 91 (FIG. 7C).

The sealing lip 81*c* in FIG. 7C cannot move into the gland 91, so it will be flattened when the handling surface 3 is pressed towards an object 14 (FIGS. 1A-1C) when suction is applied. This gasket alternative is not self-aligning, and it will wear out faster than the self-aligning gaskets described above. The downtime for replacing this gasket is, however, much shorter than for a glued-in gasket, so it can be used as an alternative to the formed, self-aligning gasket 8 described above. It may for instance be useful in emergencies if a preformed gasket is not available.

Although a few embodiments have been shown and described, it would be appreciated by those skilled in the art that changes may be made in these embodiments without departing from the principles and spirit of the invention, the scope of which is defined in the claims and their equivalents.

Figure 6A:
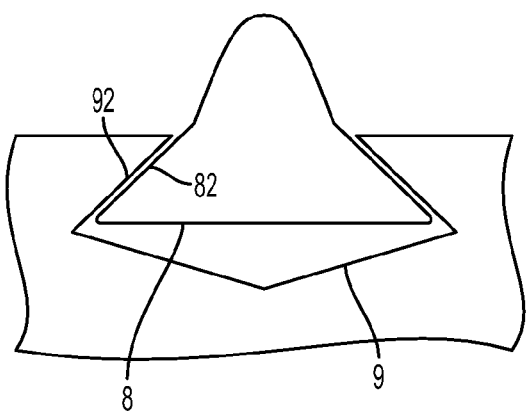
FIGS. 6A-6C show various gasket structures according to embodiments of the present disclosure.
Figure 6B:
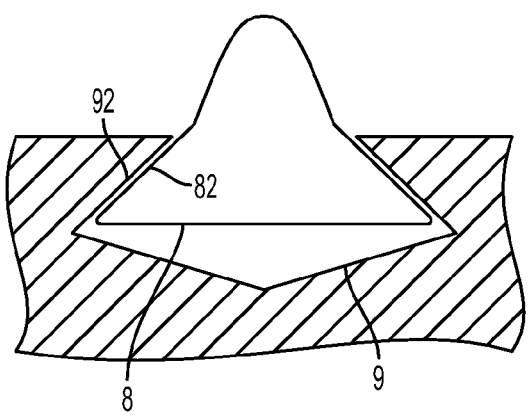
Figure 6C:
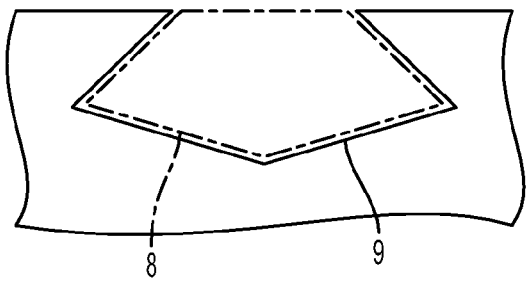

For example, although FIG. 3A show an approximate dovetail portion 92 which is concave and a lower rounded shoulder portion 82 which is convex, this relationship may be reversed and the approximate dovetail portion 92 may be convex and the lower rounded shoulder portion 82 may be concave as shown in FIG. 6A. Further, both the approximate dovetail portion 92 and the shoulder portion 82 may be flat as shown in FIG. 6B. Alternate configurations where the cross-sectional area of the gasket 8 are less than the cross-sectional area of the gland 9 are also contemplated such as shown in FIG. 6C.

As a further example, although only one vacuum tube 4 and compressed air channel 7 is shown, two or more vacuum tubes 4 and compressed air channels 7 may be employed. Further, the treatment member 1 may be equipped with movable parts which can be shifted towards the object. Further the treatment member 1 may include channels 6 for cooling as well as heating, and, of course, the handling member may receive the object from either the movable or the fixed part of the forming tool.

As a still further example, both the passive and active gasket structure disclosed herein are not limited to thermal treatment devices, but may be utilized in any application where two surfaces are held together by vacuum.

Although embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A tool for holding objects by suction, comprising:
   a handling surface;
   a gland formed below the handling surface having an approximate dovetail section with a narrow opening at the handling surface defining a suction area;
   a gasket inserted in the gland having a shoulder portion that approximately conforms to the shoulder portion of the approximate dovetail section of the gland and a sealing lip protruding through said narrow opening; and
   a connection from the suction area to a vacuum source.

2. The tool according to claim 1, wherein no adhesive is used to secure the gasket in the gland.

3. The tool according to claim 2, wherein there is a space between the bottom of the gasket and the bottom of the gland.

4. The tool according to claim 1, wherein said gasket is made of soft silicon rubber.

5. The tool according to claim 4, wherein the gasket comprises a plurality of short segments placed end to end with small gaps between the ends.

6. The tool according to claim 3, further comprising a compressed air inlet opening onto the space.

7. The tool according to claim 4, wherein the gasket has a circular cross section that is larger than the cross section of the approximate dovetail section of the gland, whereby a sealing lip is formed when the gasket is pressed onto the gland.

8. A tool according to claim 1 for use in a thermal treatment device comprising:
   a forming tool, the forming tool including a fixed part and a movable part;
   a handling member, the handling member being a robot; and
   a treatment tool carried by the handling member, wherein a treatment surface on the handling member comprises the handling surface of the tool.

9. A tool according to claim 1 for use in a thermal treatment device comprising:
   a forming tool, the forming tool including a fixed part and a movable part;
   a handling member, the handling member being a robot;
   a treatment tool carried by the handling member, wherein a treatment surface on the handling member comprises the handling surface of the tool;
   cooling channels to transport the cooling medium below the treatment surface; and
   inlet and outlet members to inlet and outlet a cooling medium.

10. The tool according to claim 9, wherein no adhesive is used to secure the gasket in the gland.

11. The tool according to claim 10, wherein there is a space between the bottom of the gasket and the bottom of the gland.

12. The tool according to claim 11, further comprising a compressed air inlet opening into the space.

13. The tool according to claim 10, wherein the gasket is made of soft silicon rubber.

14. The tool according to claim 10, wherein the gasket comprises a plurality of segments placed end to end.

15. A tool according to claim 1 for use in a casting machine system comprising:
   a forming tool, the forming tool including a fixed part and a movable part;
   a handling member, the handling member being a robot;
   a thermal treatment device carried by the handling member;
   the handling surface of the tool acting as a treatment surface on the treatment device; cooling channels to transport a cooling medium below the treatment surface;
   inlet and outlet members to inlet and outlet the cooling medium; and
   a space between the bottom of the gasket of the tool and the bottom of the gland of the tool.

* * * * *